(12) United States Patent
Richards et al.

(10) Patent No.: US 10,110,834 B2
(45) Date of Patent: Oct. 23, 2018

(54) HADAMARD ENHANCED SENSORS (75) Inventors: Chet L. Richards, Thousand Oaks, CA (US); Victor Wang, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 1958 days.

(21) Appl. No.: 13/290,409

(22) Filed: Nov. 7, 2011

(65) Prior Publication Data

US 2013/0113921 A1 May 9, 2013

(51) Int. Cl.
*H04N 5/349* (2011.01)
*H04N 5/225* (2006.01)
*H04N 5/232* (2006.01)
*G02B 27/46* (2006.01)

(52) U.S. Cl.
CPC ............ *H04N 5/349* (2013.01); *G02B 27/46* (2013.01); *H04N 5/2254* (2013.01); *H04N 5/23232* (2013.01); *G02B 2207/129* (2013.01)

(58) Field of Classification Search
CPC ............ G02B 2207/129; G02B 27/46; H04N 5/2254; H04N 5/23232; H04N 5/349
USPC ........................................................ 348/135
See application file for complete search history.

(56) References Cited

U.S. PATENT DOCUMENTS

| 3,775,602 | A | 11/1973 | Alexandridis et al. |
| 4,310,743 | A * | 1/1982 | Seliger ..................... 219/121.12 |
| 4,800,288 | A | 1/1989 | Inagaki et al. |
| 5,262,871 | A | 11/1993 | Wilder et al. |
| 5,737,075 | A | 4/1998 | Koch et al. |
| 6,249,312 | B1 | 6/2001 | Broekaert |
| 6,459,694 | B1 | 10/2002 | Sari et al. |
| 7,804,624 | B2 | 9/2010 | Cernasov |
| 2008/0130069 | A1 * | 6/2008 | Cernasov ....................... 358/487 |
| 2008/0218851 | A1 * | 9/2008 | Chen et al. .................... 359/419 |
| 2010/0309467 | A1 * | 12/2010 | Fox et al. ...................... 356/326 |
| 2011/0254985 | A1 | 10/2011 | Hiramoto et al. |

FOREIGN PATENT DOCUMENTS

| WO | 98/46007 A1 | 10/1998 |
| WO | 1998046007 A1 | 10/1998 |

OTHER PUBLICATIONS

Decker, J.A., Jr.,; Hadamard-Transform Image Scanning; Applied Optics; vol. 9, No. 6; Jun. 1970; pp. 1392-1395.

* cited by examiner

*Primary Examiner* — Anner N Holder
(74) *Attorney, Agent, or Firm* — Burns & Levinson, LLP; Joseph M. Maraia (57) ABSTRACT

A method for increasing the pixel count delivered from a plurality of light detectors when scanning an object that includes positioning a mask, having a plurality of two dimensional Walsh-Hadamard filter patterns, in front of a plurality of light detectors to control the passage of light through the mask filter patterns to the light detectors. The method also includes positioning a lens assembly in front of the mask to project an image through the mask filter patterns on to the plurality of light detectors. The method also includes moving the mask, plurality of light detectors, or the image in a plane defined by a planar surface of the plurality of light detectors. The method also includes measuring the filtered image projected through the mask with the plurality of light detectors.

17 Claims, 8 Drawing Sheets

HADAMARD ENHANCED SENSORS

FIELD OF THE INVENTION

The currently described invention relates to methods and apparatus for increasing the number of pixels delivered by a focal plane detector array.

BACKGROUND

Conventional electronic imaging techniques rely on the number of detectors that can be assembled together in a single array. Current manufacturing techniques limit detector resolution and how tightly the detectors can be spaced in an array. In addition, applications for detector arrays continue to call for detector arrays having smaller physical footprints while increasing pixel density. A need therefore exists for improved methods and systems for increasing pixel density delivered by detector arrays.

SUMMARY

One embodiment is a method for increasing the pixel count delivered from a plurality of light detectors when scanning an object. The method includes positioning a mask, having a plurality of two dimensional Walsh-Hadamard filter patterns, in front of a plurality of light detectors to control the passage of light through the mask filter patterns to the light detectors. The method also includes positioning a lens assembly in front of the mask to project an image through the mask filter patterns on to the plurality of light detectors. The method also includes moving the mask, plurality of light detectors, or the image in a plane defined by a planar surface of the plurality of light detectors. The method also includes measuring the filtered image projected through the mask with the plurality of light detectors.

In some embodiments, the method includes storing a set of data representing the measured filtered image. In some embodiments, the method includes retrieving a representation of the projected image from the stored set of data by performing an inverse Walsh-Hadamard transform on the stored set of data. In some embodiments, the method includes moving the mask relative to the plurality of light detectors and the image.

In some embodiments, the method includes moving the plurality of light detectors relative to the mask and image. In some embodiments, the method includes moving the image relative to the plurality of light detectors and the mask. In some embodiments, the method includes moving one of the mask, plurality of light detectors, or the image along one or more axes.

Another embodiment is an apparatus for scanning an object. The apparatus includes a mask that includes a plurality of two dimensional Walsh-Hadamard filter patterns to control the passage of light through the mask. The apparatus also includes a plurality of light detectors located on a first side of the mask to measure light passing through the mask. The apparatus also includes a lens assembly located on a second side of the mask to project an image through the mask on to the plurality of detectors to generate a filtered image. The apparatus also includes an actuator to move the mask, plurality of light detectors, or the image.

In some embodiments, the actuator moves in a step and repeat motion. In some embodiments, the mask is coupled to the plurality of light detectors. In some embodiments, the actuator is configured to move one of the mask, plurality of light detectors, or the image along one or more axes.

In some embodiments, the actuator is configured to move the mask relative to the plurality of light detectors and the image. In some embodiments, the actuator is configured to move the plurality of light detectors relative to the mask and image. In some embodiments, the actuator is configured to move the image relative to the plurality of light detectors and the mask. In some embodiments, the apparatus includes a computer memory configured to store a set of data representing the measured filtered image. In some embodiments, the apparatus includes an image displacing element to move the image relative to the plurality of light detectors and the mask.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings, in which.

DETAILED DESCRIPTION OF ILLUSTRATIVE EMBODIMENTS

Embodiments disclosed herein significantly increase the number of pixels delivered by a standard focal plane detector array. The increase is the result of applying Walsh-Hadamard masks, in the form of micro masks, to the focal plane imagery. By using the Walsh-Hadamard masks it is possible to increase the number of pixels delivered by each individual detector by a factor corresponding to the pattern mask subarray size. For example, a pattern mask having a 4×4 Walsh-Hadamard array size increases pixel density by a factor of 16 (4×4=16).

Figure 1:
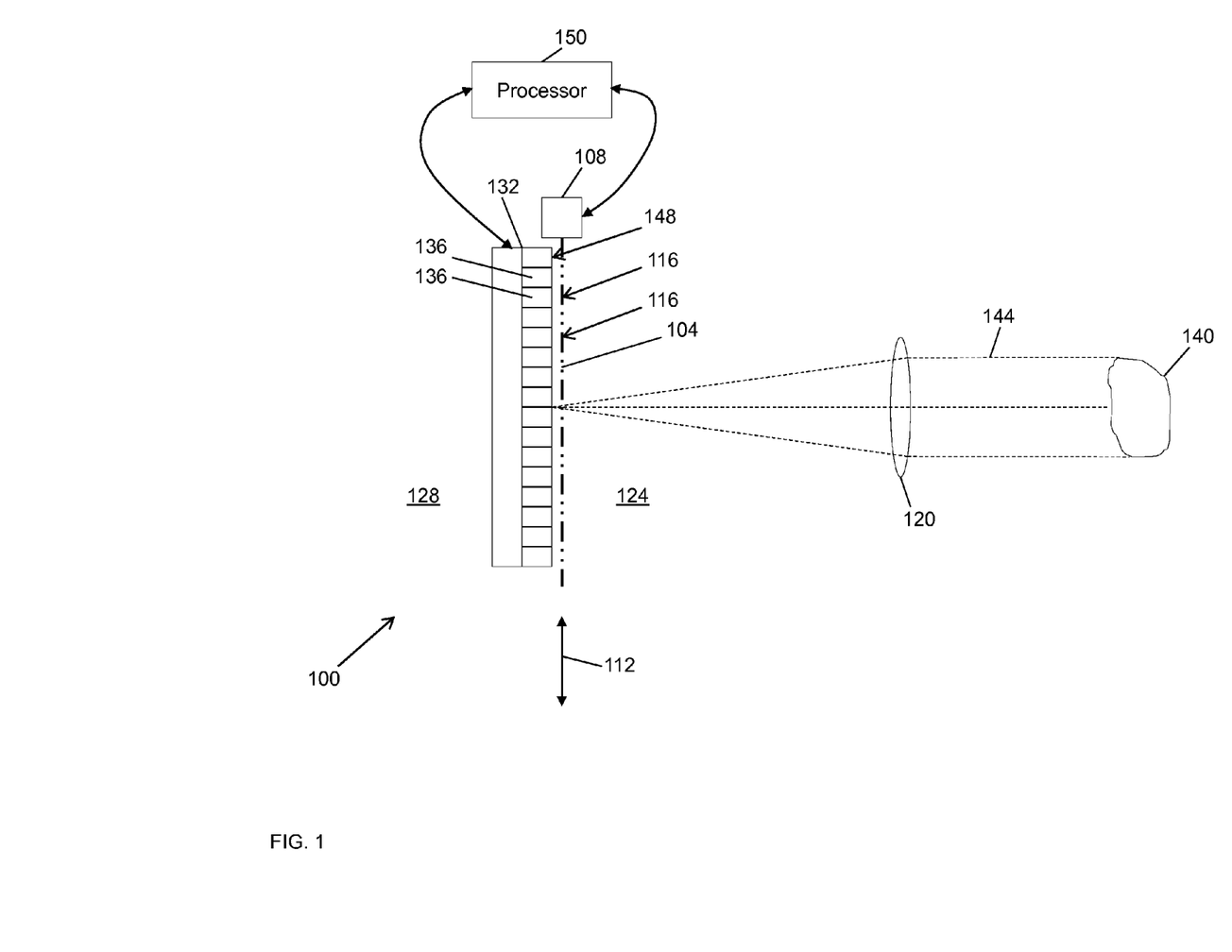
FIG. 1 is a schematic illustration of an apparatus for scanning an object, according to an illustrative embodiment.

FIG. 1 is a schematic illustration of an apparatus 100 for scanning an object, according to an illustrative embodiment. The apparatus 100 includes a mask 104 that has a plurality of two-dimensional Walsh-Hadamard filter patterns 116. The filter patterns 116 of the mask 104 control the passage of light through the mask 104. An actuator 108 is coupled to the mask 104 to controllably move the mask 104 along the direction of axis 112. The apparatus 100 also includes a detector array 132 located on a first side 128 of the mask 104 to measure light passing through the mask 104.

The detector array 132 includes a plurality of light detectors 136 for measuring the light passing through the mask 104 from the second side 124 of the mask 104 to the first side 128 of the mask. In this embodiment, the mask 104 is actuated to move along a single axis 112 parallel to the face 148 of the light detectors 136. The apparatus 100 also includes a processor 150 coupled to the actuator 108 and the detector array 132. The processor 150 provides commands to the actuator 108 to controllably move the mask 104. The processor 150 also receives the outputs from the light detectors 136 of the detector array 132. The processor 150 includes computer memory and stores the light detector 136 outputs in the computer memory for subsequent processing and/or retrieval.

The apparatus 100 also includes a lens assembly 120 located on the second side 124 of the mask 104. The lens assembly 104 projects an image 144 of an object 140 through the mask 104 on to the plurality of light detectors 136 to generate a filtered image.

Figure 2A:
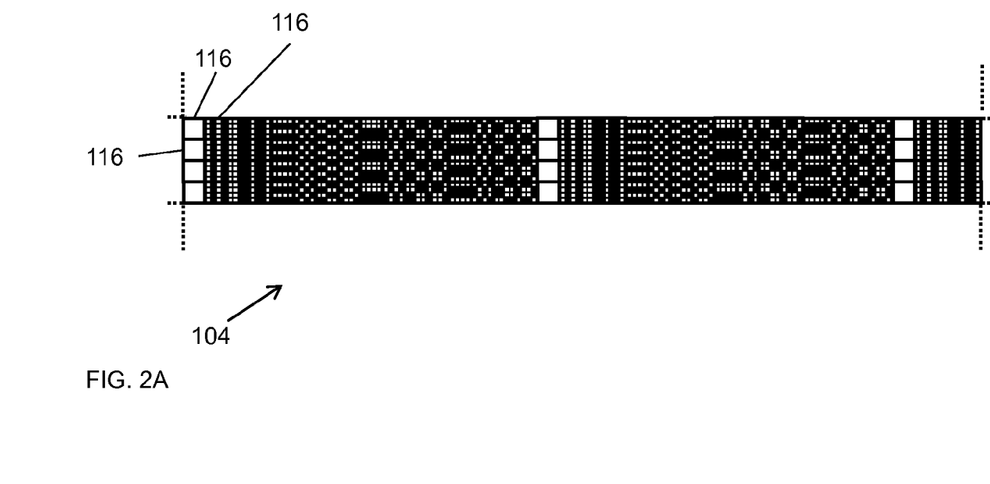
FIG. 2A is a schematic illustration of a one-dimensional array Walsh-Hadamard filter pattern, according to an illustrative embodiment.
Figure 2B:
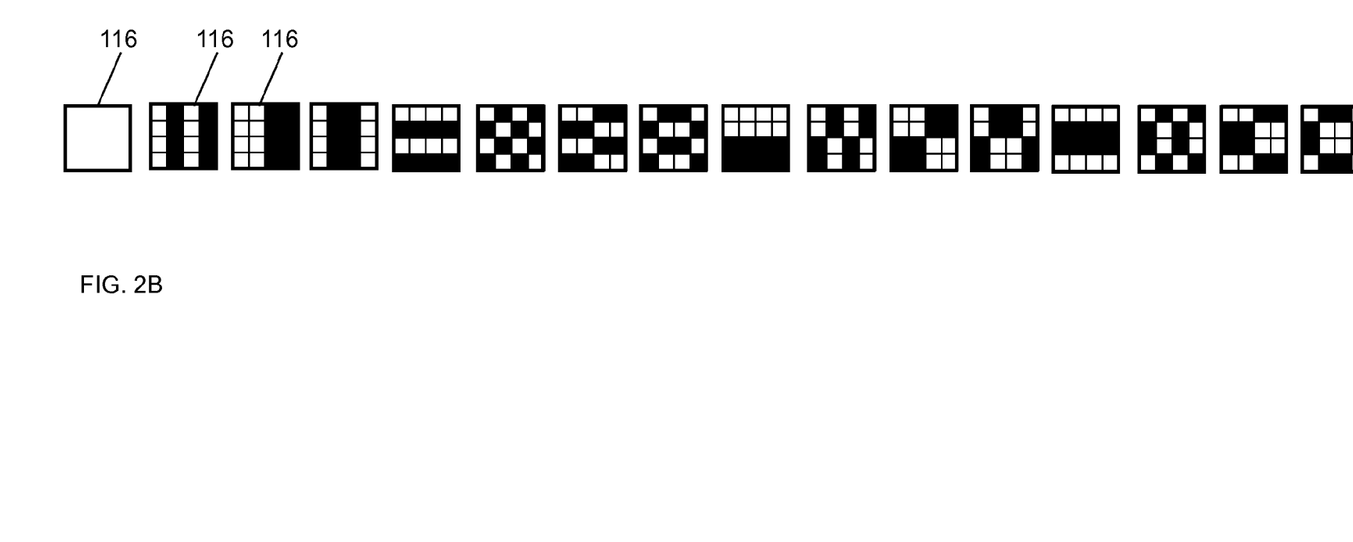
FIG. 2B is a schematic illustration of the one-dimensional array Walsh-Hadamard filter pattern with the mask patterns spaced for illustration purposes.

Referring to FIG. 2A, in this embodiment, sixteen (16) Walsh Hadamard filter patterns 116 (also referred to as pattern blocks) are used for the mask 104. Each pattern block 116 subdivides a detector into a 4×4 subarray. Thus each detector is capable of reporting out sixteen (16) sub-pixels in a 4×4 subarray. The linear sequence of pattern blocks 116 is repeated horizontally and vertically to entirely cover the focal plane region of the detector array 132. The linear sequence of pattern blocks 116 is evident when compared with a single linear sequence of 4×4 pattern blocks 116 as shown in FIG. 2B (the individual pattern blocks 136 are separated for clarity of illustration purposes). In this embodiment, the full mask is extended an extra sixteen detectors in width so no part of the focal plane is left unmasked when the mask 104 is moved along the rows of detectors.

Walsh-Hadamard (WH) matrices provide a set of orthogonal basis vectors which can be used to fully represent sampled signals which have $2^n$ samples. In one embodiment, the WH matrices are developed (e.g., performing a WH transform) by starting with a primitive 2×2 matrix of the following form:

$$H_2 = \begin{bmatrix} 1 & 1 \\ 1 & -1 \end{bmatrix} \qquad \text{EQN. 1}$$

This primitive matrix is then expanded by replacing each of the terms in the primitive matrix with the primitive matrix, itself. The result of the first expansion is a type of outer product matrix of the following form:

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \qquad \text{EQN. 2}$$

Each of the rows in EQNS. 1 and 2 is an orthogonal WH basis vector. Thus, from EQN. 1 we have the four vectors:

$$h_1 = 1,1,1,1 \qquad \text{EQN. 3}$$

$$h_2 = 1,-1,1,-1 \qquad \text{EQN. 4}$$

$$h_3 = 1,1,-1,-1 \qquad \text{EQN. 5}$$

$$h_4 = 1,-1,-1,1 \qquad \text{EQN. 6}$$

This process can be continued to produce eight basis vectors of eight elements, sixteen basis vectors of sixteen elements, and so on.

In some embodiments, a specific type of WH basis function is used (Binary Walsh (BW) vectors) for non-coherent optical applications where it is difficult to create a mask with −1 openings. In a BW matrix (and function set), the −1 values are replaced by 0. Thus, EQNS. 3, 4, 5 and 6 convert to;

$$w_1 = 1,1,1,1 \qquad \text{EQN. 7}$$

$$w_2 = 1,0,1,0 \qquad \text{EQN. 8}$$

$$w_3 = 1,1,0,0 \qquad \text{EQN. 9}$$

$$w_4 = 1,0,0,1 \qquad \text{EQN. 10}$$

Each of these basis vectors can be arranged in any desired geometrical pattern. The basis vectors of EQNS. 7, 8, 9 and 10 could be arranged in 2×2 patterns. In this embodiment, we focus on sixteen element basis vectors for the mask 104. The principles discussed here are applicable to any BW and WH basis function set of any $2^n$ size.

Figure 2C:
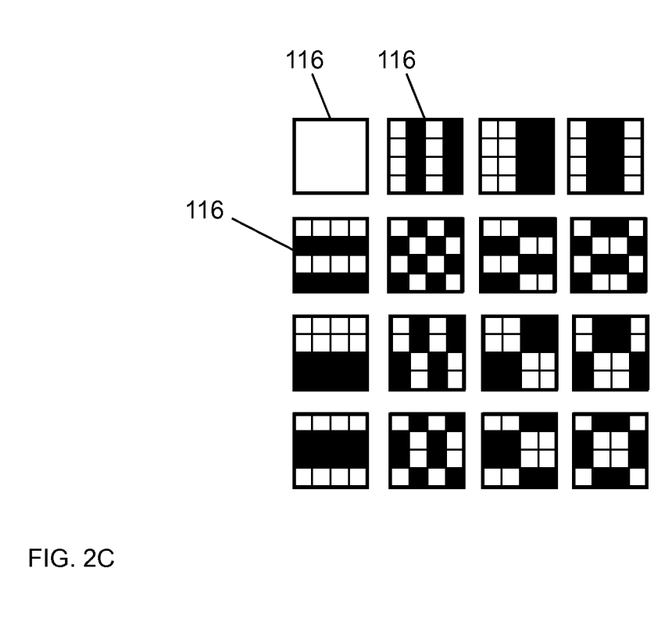
FIG. 2C is a schematic illustration of a two-dimensional array Walsh-Hadamard filter pattern, according to an illustrative embodiment.
Figure 2D:
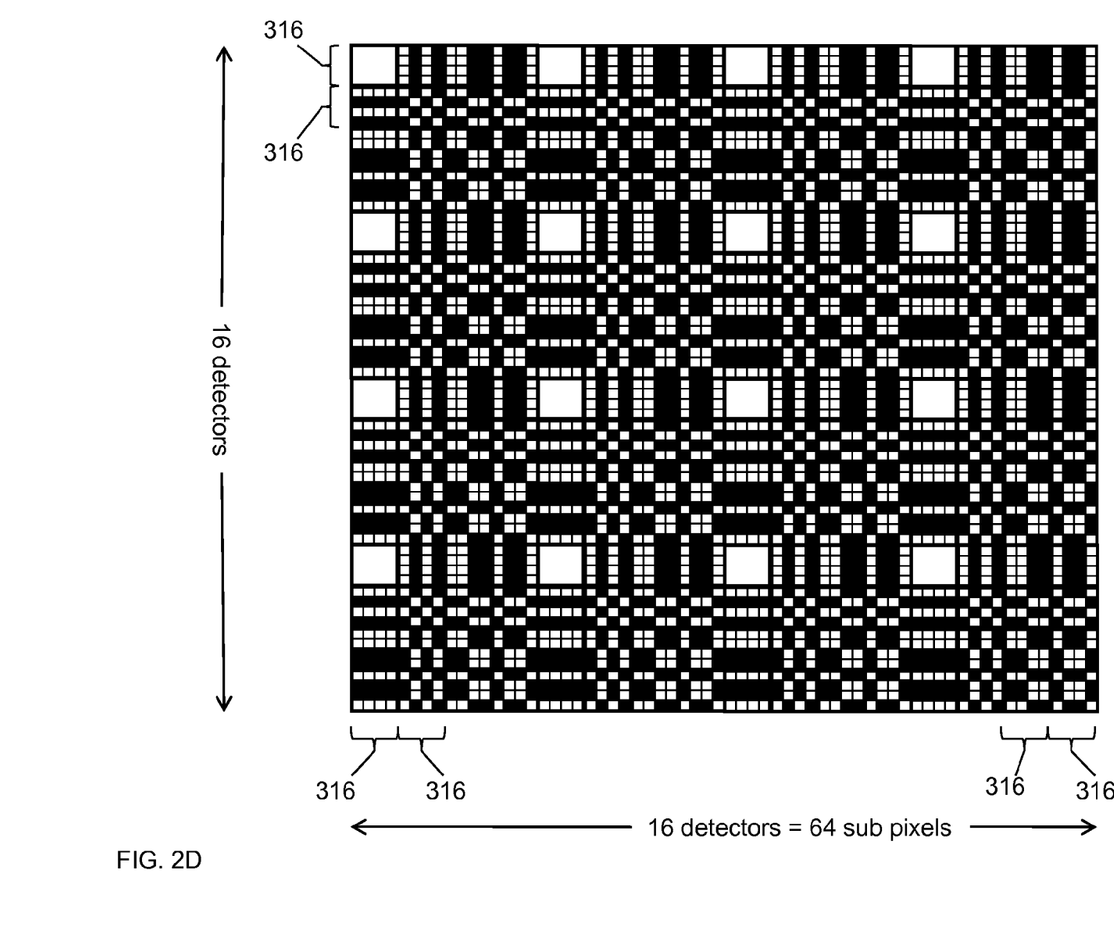
FIG. 2D is a schematic illustration of a two-dimensional array Walsh-Hadamard filter pattern having a four by four step pattern, according to an illustrative embodiment.

Referring to FIG. 1, in this embodiment, movement of mask 104 is performed using a step and repeat motion along the axis 112. The detectors 136 are subjected to the light passing through the mask 104 for a finite amount of time to allow the detectors 136 to accumulate sufficient photo electrons to produce a low noise image from the object 140. Thus, the pattern blocks 116 are commanded to hold a position above its corresponding detector for an appropriate length of time while the detector integrates the light. After this short dwell time the mask 104 is stepped along axis 112 so that each pattern block 116 moves to overlay the next detector in the row. After the mask 104 has moved sixteen steps (in this example) the motion is reversed and the mask 104 returns, step wise, to its starting position to repeat the cycle. In an exemplary embodiment, the total motion of the mask 104 is relatively small. For a detector 136 having a typical size of 15 microns and using a mask in which 16 mask steps are performed, the total linear mask motion is 240 microns. Two-axis motion may be used in alternative embodiments but would require a different spatial arrangement of the filter patterns 116 (e.g., Walsh-Hadamard filter pattern arrangement of FIG. 2C).

With each step and dwell of the mask 104, the pattern of light falling on a given detector 136 is spatially modulated by the pattern block 116 immediately above the detector 136. The detector 136 thus reports out the corresponding Walsh-Hadamard filter pattern sequency component. The sequency of a Walsh-Hadamard function is a property analogous to the frequency of a sinusoid. A sequency ordered Walsh-Hadamard matrix is arranged so the number of sign changes in a row is in increasing order. For example, referring to FIG. 2, the matrix is sequency ordered where the successive rows have 0, 1, 2 and 3 sign changes. When the mask 104 is stepped to the next location, the detector 136 is masked by the next pattern block 116 in the sequence. The detector 136 then reports out the next sequency component. After sixteen steps, and sixteen different pattern blocks have covered the detector 136, the detector 136 will have reported out the full sequency spectrum of the pattern of light falling on the detector 136.

The following code fragments in C++ show the process of encoding and decoding a sampled function f[i] (i.e., creating a BW basis vector set, followed by expansion of f[i] in terms of these bases (i.e., applying a BW transform), to make a transformed function F[j]. Then, the process is inverted using a WH basis vector set (i.e. a WH transform) to recover a function, g[i], which matches the original f[i]: g[i]=f[i]. Recovery of the original light pattern involves performing a Walsh-Hadamard transform on the spectrum, which is performed, in one embodiment, according to the following code fragments and starting with the creation of the BW basis set from the WH basis set. Both basis sets are matrices with the basis vectors being the rows of their matrices. Note that the matrix is symmetrical. The WH matrix is also orthogonal, which means that multiplied by itself it produces the identity matrix:

```
double basis[ROW][COL] =
{{+1, +1, +1, +1, +1, +1, +1, +1, +1, +1, +1, +1, +1, +1, +1, +1},
 {+1, -1, +1, -1, +1, -1, +1, -1, +1, -1, +1, -1, +1, -1, +1, -1},
 {+1, +1, -1, -1, +1, +1, -1, -1, +1, +1, -1, -1, +1, +1, -1, -1},
 {+1, -1, -1, +1, +1, -1, -1, +1, +1, -1, -1, +1, +1, -1, -1, +1},
 {+1, +1, +1, +1, -1, -1, -1, -1, +1, +1, +1, +1, -1, -1, -1, -1},
 {+1, -1, +1, -1, -1, +1, -1, +1, +1, -1, +1, -1, -1, +1, -1, +1},
 {+1, +1, -1, -1, -1, -1, +1, +1, +1, +1, -1, -1, -1, -1, +1, +1},
 {+1, -1, -1, +1, -1, +1, +1, -1, +1, -1, -1, +1, -1, +1, +1, -1},
 {+1, +1, +1, +1, +1, +1, +1, +1, -1, -1, -1, -1, -1, -1, -1, -1},
 {+1, -1, +1, -1, +1, -1, +1, -1, -1, +1, -1, +1, -1, +1, -1, +1},
 {+1, +1, -1, -1, +1, +1, -1, -1, -1, -1, +1, +1, -1, -1, +1, +1},
 {+1, -1, -1, +1, +1, -1, -1, +1, -1, +1, +1, -1, -1, +1, +1, -1},
 {+1, +1, +1, +1, -1, -1, -1, -1, -1, -1, -1, -1, +1, +1, +1, +1},
 {+1, -1, +1, -1, -1, +1, -1, +1, -1, +1, -1, +1, +1, -1, +1, -1},
 {+1, +1, -1, -1, -1, -1, +1, +1, -1, -1, +1, +1, +1, +1, -1, -1},
 {+1, -1, -1, +1, -1, +1, +1, -1, -1, +1, +1, -1, +1, -1, -1, +1},};
```

The following code fragment zeros out the negative entries:

```
for(int j=0;j<ROW;j++)
{
  for(int i=0;i<COL;i++)
  {
    if(basis[j][i]==-1)    //convert to transmission mask
    {
      basis[j][i]=0;
    }
  }
}
```

Next, we transform f[i] to F[j] by matrix multiplication of f[i] by the BW matrix:
//COMPUTE THE HADAMARD TRANSFORMED FUNCTION F[ ] from f[ ]:

```
for(int j=0;j<ROW;j++)
{
  double sum=0;
  for(int i=0;i<COL;i++)
  {
    sum=sum+f[i]*basis[j][i];
  }
  F[j]=sum;
}
```

The return from F[j] to an auxiliary function g[i] involves, first, multiplication of F[j] by the WH matrix. Note that the result is rescaled according to the number of elements in the vector, 2/ROW:
//NOW, INVERT THE HADAMARD TRANSFORM TO GET g[ ] (note the rescaling):

```
for(int j=0;j<ROW;j++)
{
  double sum=0;
  for(int i=0;i<COL;i++)
  {
    basis[j][i]=2*basis[j][i]-1;
    sum=sum+F[i]*basis[j][i];
  }
  g[j]=2*sum/ROW;
}
```

The zero term, f[0], then needs adjustment. We make this adjustment by subtracting F[0]:
//Adjust the zero sequency term:
g[0]=g[0]-F[0];
This completes the recovery of g[i]=f[i] after f[i] has been expanded in the BW basis vector set.

Figure 3:
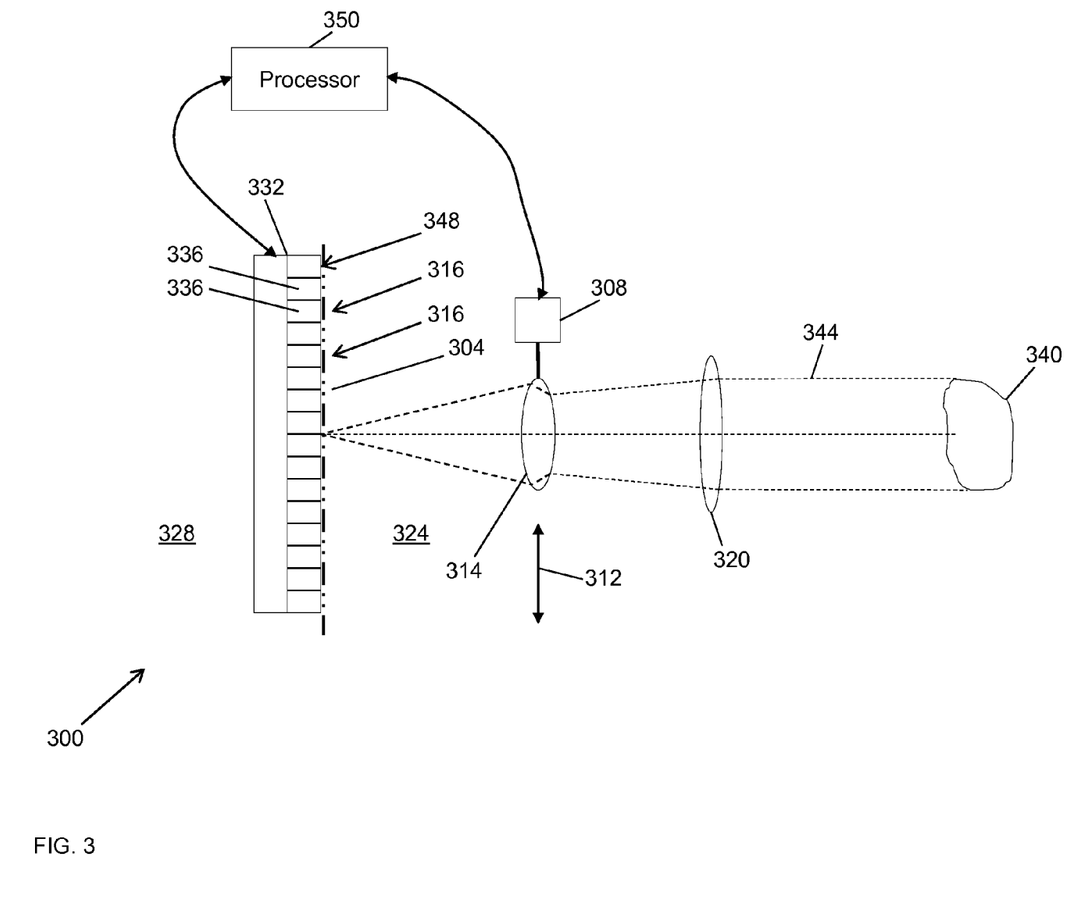
FIG. 3 is a schematic illustration of an apparatus for scanning an object, according to an illustrative embodiment.

FIG. 3 is a schematic illustration of an apparatus 300 for scanning an object, according to another illustrative embodiment. In this embodiment, the mask is fixed in front of the detectors and the image is stepped across the detector array. The apparatus 300 includes a mask 304 that has a plurality of two-dimensional Walsh-Hadamard filter patterns 316. The filter patterns 316 of the mask 304 control the passage of light through the mask 304. The mask 304 is fixed with respect to the plurality of detectors 336 of the detector array 332. The detectors 336 measure the light passing through the mask 304 from the second side 324 of the mask 304 to the first side 328 of the mask 304.

The apparatus 300 also includes a lens assembly 320 located on the second side 324 of the mask 304. The lens assembly 320 projects an image 344 of an object 340 through the mask 304 on to the plurality of light detectors 336 to generate a filtered image. The apparatus 300 also includes an actuator 308 coupled to an image displacing element 314. In this embodiment, the actuator 308 is actuated to move along a single axis 312 parallel to the face 348 of the light detectors 336. The actuator 308 is configured to controllably move the image displacing element 314 along the direction of axis 312. The image displacing element 314 can be, for example, a mobile lens element, a steering mirror or a deformable prism. In this embodiment, the image displacing element 314 is a mobile lens element. The image displacing element 314 serves a dual function in this embodiment. The image displacing element 314 increase the pixel count and also stabilizes the image to compensate for camera shake. The actuator 308 movement can be controlled to account for shaking (undesirable movement) of, for example, the image displacing element 314 due to forces applied to the apparatus 300 by external disturbances.

The apparatus 300 also includes a processor 350 coupled to the actuator 308 and the detector array 332. The processor 350 provides commands to the actuator 308 to controllably move the image displacing element 314. The processor 350 also receives the outputs from the light detectors 336 of the detector array 332. The processor 350 includes computer memory and stores the light detector 336 outputs in the computer memory for subsequent processing and/or retrieval.

The image displacing element 314 moves transversely (along axis 312) to the propagating light. In so doing it displaces the image, along the direction of motion of the lens, with respect to the focal plane. FIG. 3 shows only a single actuator with an implied single axis of motion. In some embodiments, the apparatus 300 may instead have two axes of actuation, one axis being aligned with the rows of the detector array and the other axis aligned with the columns. With two axis actuation, the motion would be a scan through sixteen positions in a four by four step pattern, corresponding to FIG. 2D. The four by four displacement pattern minimizes the total lens excursion and thereby minimizes optical aberrations that might result from the movement of the image displacing element 314.

The image displacing element 314 is repetitively stepped in such a way that each portion of the image falls successively on a different detector 336. Because each detector 336 has a different BW pattern block 316, this repetitive stepping of the image will create a BW sequency analysis of the image for each of the sixteen basis vectors. In order to retrieve the sequency, so the subpixels of the image can be recovered, it is necessary to synchronously retrieve information from the different parts of the memory in which the set of stepped images is stored.

In normal operation, for each stepped image displacing element 314 position, an image is dissected, recorded and stored in memory in the processor 350. Suppose, for example, that a first image is recorded with the image displacing element 314 in a first position; the lens is then stepped to a second position and another image is recorded and stored in a different portion of the memory. We consider a small patch of the image which is the size of a single detector. Because the second image is displaced from the first, this image patch will move to an adjacent detector and will therefore be spatially masked in a different way from the first case. This is because the image patch is now illuminating a detector which has a different BW mask pattern. In addition, this adjacent detector will report its output to a different memory location than the first detector. This process continues until the apparatus 300 has stepped the patch image through all sixteen detector 336 positions.

Figure 4:
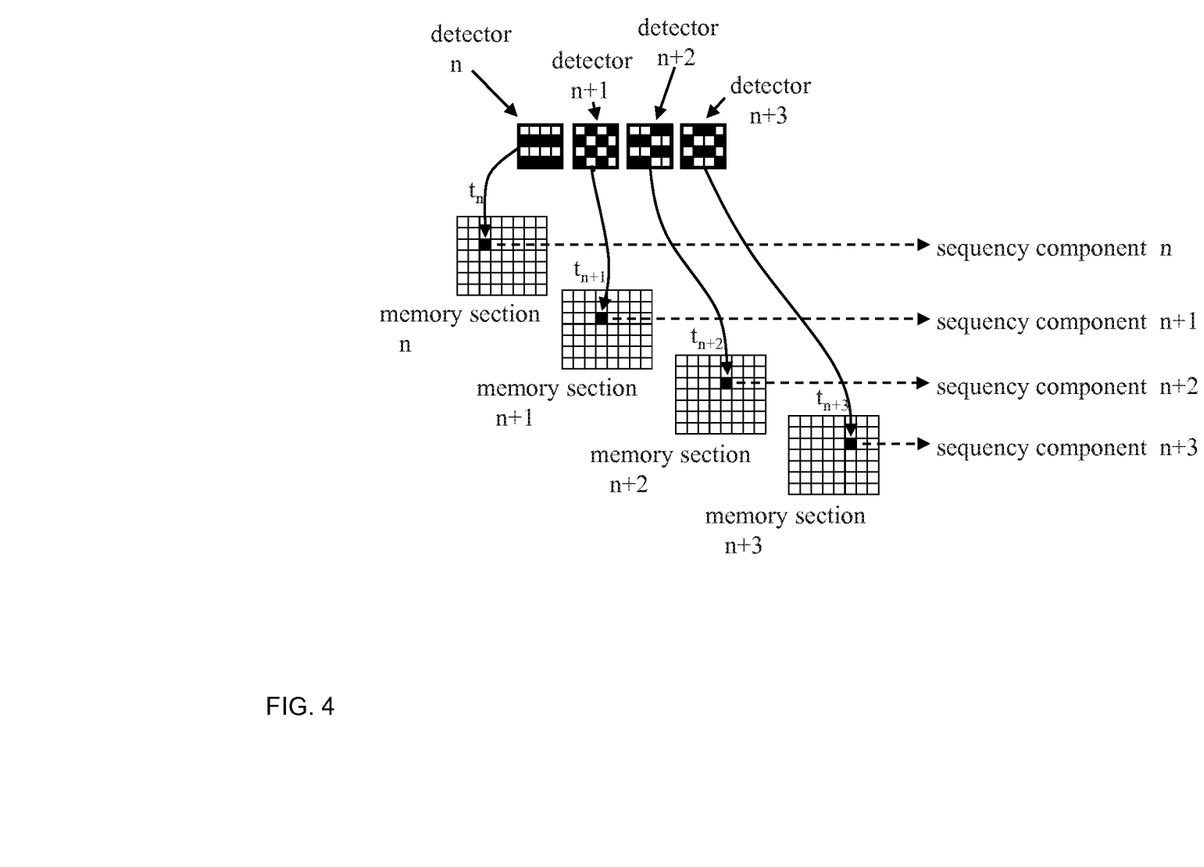
FIG. 4 is a schematic illustration of a technique for recording detector intensities and retrieving the intensities by performing a WH transformation to produce the image, according to an illustrative embodiment.

In order to reconstruct the fine pixel image of this detector-sized image patch, it is necessary to retrieve the patch's intensity measurements made from adjacent detectors as the image is stepped from each detector to an adjacent detector. This sequence of recorded intensities, retrieved from different parts of the computer memory associated with the processor, is then passed through a WH transformation and the desired fine pixel image for the selected image patch is produced. FIG. 4 illustrates the technique. Four adjacent detectors 336 from the focal plane are shown. At time $t_n$ a detector sized image patch illuminates detector n. The patch light is spatially modulated by a particular BW pattern. The output from this detector is converted from analog to digital form and is stored in a particular part of memory. This storage location, consisting of several bits of data storage, is indicated by a small black square. At time $t_{n+1}$ the image patch moves to illuminate detector n+1. The light of this patch passes through a different BW pattern. The output from this detector is converted to binary form and the resulting bits are stored in a different part of memory. Again the patch is stepped to detector n+2, and then n+3, and so on until all sixteen detectors, which are participating in recording this particular image patch, have been illuminated.

When the step-and-repeat process has been completed, the stored numbers are withdrawn from memory so as to provide sequency components n through n+3 (for this partial example). From the full set of sequency components (16 in this case) the high resolution image patch can be reconstructed. This reconstructed image patch will then be represented by sixteen micropixels which cover an area the size of a detector.

Figure 5:
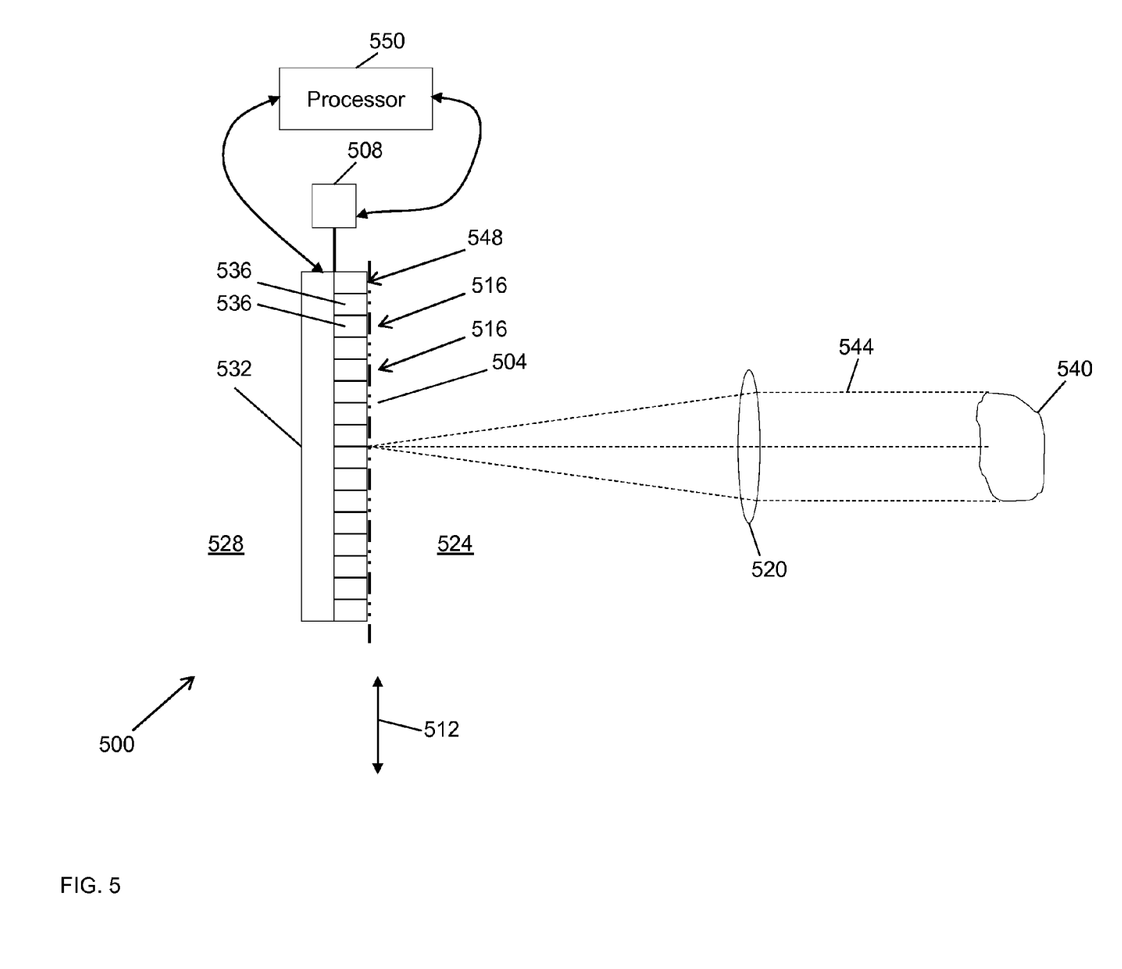
FIG. 5 is a schematic illustration of an apparatus for scanning an object, according to an illustrative embodiment.

FIG. 5 is a schematic illustration of an apparatus 500 for scanning an object, according to another illustrative embodiment. The apparatus 500 includes a mask 504 that has a plurality of two-dimensional Walsh-Hadamard filter patterns 516. The filter patterns 516 of the mask 504 control the passage of light through the mask 104. The mask 504 is fixed with respect to the plurality of detectors 536 of the detector array 532. An actuator 508 is coupled to the detector array 532 to controllably move the detector array 532 along the direction of axis 512. The detector array 532 measures light passing through the mask 504.

The apparatus 500 also includes a processor 550 coupled to the actuator 508 and the detector array 532. The processor 550 provides commands to the actuator 508 to controllably move the detector array 532. The processor 550 also receives the outputs from the light detectors 536 of the detector array 532. The processor 550 includes computer memory and stores the light detector 536 outputs in the computer memory for subsequent processing and/or retrieval. The apparatus also includes a lens assembly 520 located on the second side 524 of the mask 504. The lens assembly 504 projects an image 544 of an object 540 through the mask 504 on to the plurality of light detectors 536 to generate a filtered image.

Movement of detector array 532 is performed using a step and repeat motion along the axis 512. The detectors 536 are subjected to the light passing through the mask 504 for a finite amount of time to allow the detectors 536 to accumulate sufficient photo electrons to produce a low noise image from the image 540. Thus, the pattern blocks 516 of the mask 504 are commanded to hold a position for an appropriate length of time while the detector 536 integrates the light. After this short dwell time the detector array 532 is stepped along axis 512. After the detector array 532 has moved sixteen steps (in this example) the motion is reversed and the detector array 532 returns, step wise, to its starting position to repeat the cycle. Two-axis motion may be used in alternative embodiments but would require a different spatial arrangement of the filter patterns 516.

Figure 6:
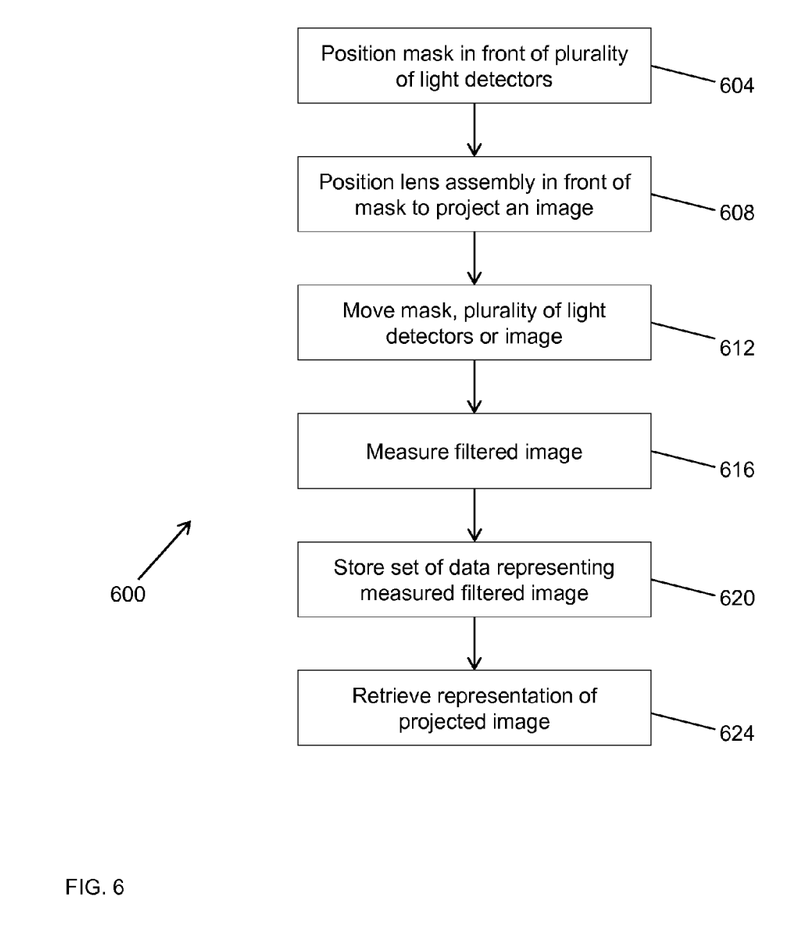
FIG. 6 is a flowchart of a method for increasing the pixel count delivered from a plurality of light detectors when scanning an object, according to an illustrative embodiment.

FIG. 6 is a flowchart 600 of a method for increasing pixel count delivered from a plurality of light detectors (e.g., light detectors 136 of the apparatus 100 of FIG. 1) while scanning an object, according to an illustrative embodiment. The method includes positioning a mask 604 in front of a plurality of light detectors to control the passage of light through the mask filter patterns to the light detectors (e.g., mask patterns 116 of mask 104 and detectors 136 of FIG. 1). The mask has a plurality of two dimensional Walsh-Hadamard filter patterns. The method also includes positioning a lens assembly 608 in front of the mask to project an image through the mask filter patterns on to the plurality of light detectors.

The method also includes moving 612 the mask, plurality of light detectors, or the image in a plane defined by a planar surface of the plurality of light detectors. The step of moving 612 can include moving one of the mask, plurality of light detectors, or the image along one or more axes. In some embodiments, the method includes moving the mask relative to the plurality of light detectors and the image. In other embodiments, the method includes moving the plurality of light detectors relative to the mask and image. In other embodiments, the method includes moving the image relative to the plurality of light detectors and the mask The method also includes measuring the filtered image 616 projected through the mask with the plurality of light detectors. The method also includes storing a set of data 620 representing the measured filtered image using, for example, the processor 150 of FIG. 1. The method also includes retrieving a representation of the projected image from the stored set of data by performing an inverse Walsh-Hadamard transform on the stored set of data, similarly as described previously herein.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for increasing the pixel count delivered from a plurality of electro-optical light detectors when scanning an object, comprising:
   positioning a mask, having a plurality of two dimensional Walsh-Hadamard filter patterns, in front of a plurality of light detectors to control the passage of light through the mask filter patterns to the light detectors, the mask and plurality of filter patterns being spaced adjacent to each other in respective planar and parallel alignment;
   positioning a lens assembly in front of the mask to project an image through the mask filter patterns on to the plurality of light detectors;
   moving the mask, plurality of light detectors, or the image in its plane parallel to the planar surface of the plurality of light detectors; and
   measuring the filtered image projected through the mask with the plurality of light detectors by creating and sequentially storing a digitized set of filter pattern blocks of data presenting the filtered image falling successively on different detectors, and sequentially and, subsequently, synchronously to the storage, retrieving a representation of the projected image from the stored set of data and performing an inverse Walsh-Hadamard transform on the stored set of data.

2. The method of claim 1, comprising moving the mask relative to the plurality of light detectors and the image.

3. The method of claim 1, comprising moving the plurality of light detectors relative to the mask and image.

4. The method of claim 1, comprising moving the image relative to the plurality of light detectors and the mask.

5. The method of claim 1, comprising moving one of the mask, plurality of light detectors, or the image along one or more axes.

6. The method of claim 4, comprising using an image displacing element to move the image relative to the plurality of light detectors and the mask.

7. An apparatus for scanning an object to electro-optically detect an image and process or display it with high pixel density, comprising:
   a mask comprising a planar form array of a plurality of two dimensional Walsh-Hadamard filter patterns to control the passage of light through the mask;
   a plurality of light electro-optical detectors in planar form array located on a first side of the mask, substantially adjacent and parallel thereto, to measure light passing through the mask,
   a lens assembly located on a second side of the mask to project an image through the mask on to the plurality of detectors to generate a filtered image;
   an actuator to move the mask, plurality of light detectors, or the image, and
   a processor constructed and arranged to measure the filtered image projected through the mask on to light detectors by creating and sequentially storing digitized set of filter pattern blocks of data representing the filtered image falling successively on different detectors, and subsequently a sequentially and synchronously to the storage, retrieving a representation of the projected image from the stored set of data and performing an inverse Walsh-Hadamard transform on the stored set of data.

8. The apparatus of claim 7, wherein the actuator is constructed and arranged to move in a step and repeat motion with dwell time of the steps sufficient to allow imaged detectors to accumulate sufficient photo electrons to reduce noise from the filtered image projected thereon.

9. The apparatus of claim 7, wherein the mask is coupled to the plurality of light detectors.

10. The apparatus of claim 7, wherein the actuator is configured to move one of the mask, plurality of light detectors, or the image along one or more axes.

11. The apparatus of claim 7, wherein the actuator is configured to move the mask relative to the plurality of light detectors and the image.

12. The apparatus of claim 7, wherein the actuator is configured to move the plurality of light detectors relative to the mask and image.

13. The apparatus of claim 7, wherein the actuator is configured to move the image relative to the plurality of light detectors and the mask.

14. The apparatus of claim 7, comprising a computer memory configured to store a set of data representing the measured filtered image.

15. The apparatus of claim 7, comprising an image displacing element to move the image relative to the plurality of light detectors and the mask.

16. A method for increasing the pixel count delivered from a plurality of light detectors when scanning an object, comprising:
   positioning a mask, having a plurality of two dimensional Walsh-Hadamard filter patterns, in front of a plurality of light detectors to control the passage of light through the mask filter patterns to the light detectors;
   positioning a lens assembly in front of the mask to project an image through the mask filter patterns on to the plurality of light detectors;

moving the mask, plurality of light detectors, or the image in a plane defined by a planar surface of the plurality of light detectors; and measuring the filtered image projected through the mask with the plurality of light detectors by creating and sequentially storing a digitized set of filter pattern blocks of data representing the filtered image falling successively on different detectors and, subsequently, sequentially and synchronously to the storage, retrieving a representation of the projected image from the stored set of data and performing an inverse Walsh-Hadamard transform on the stored set of data with Binary Walsh sequencing analysis.

17. An apparatus for scanning an object and storing and retrieving the object image in high pixel density, comprising:

a mask comprising a planar form array of a plurality of two dimensional Walsh-Hadamard filter patterns to control the passage of light through the mask;

a plurality of light detectors in planar array form located on a first side of the mask to measure light passing through the mask, substantially adjacent and parallel thereto;

a lens assembly located on a second side of the mask to project an image through the mask on to the plurality of detectors to generate a filtered image;

an actuator to move the mask, plurality of light detectors, or the image; and a processor connected to the detector array and constructed and arranged to create and sequentially store a digitized set of filter pattern blocks of data representing the filtered image falling successively on different detectors and subsequently, sequentially and synchronously to the storage, retrieve a representation of the projected image from the stored set of data and performing an inverse Walsh-Hadamard transform on the stored set of data, with Binary Walsh sequencing analysis.

* * * * *